Nov. 8, 1938.  A. R. SPICACCI  2,136,155

LOCKING DEVICE FOR BEARINGS AND THE LIKE

Filed Feb. 26, 1936

INVENTOR:
ATTILIO R. SPICACCI,
BY Gales P. Moore
HIS ATTORNEY.

Patented Nov. 8, 1938

2,136,155

UNITED STATES PATENT OFFICE 2,136,155

LOCKING DEVICE FOR BEARINGS AND THE LIKE

Attilio R. Spicacci, Bristol, Conn., assignor to General Motors Corporation, Detroit, Mich., a corporation of Delaware Application February 26, 1936, Serial No. 65,863

6 Claims. (Cl. 308—236)

This invention relates to locking devices for bearings and the like and comprises all of the features of novelty herein disclosed. An object of the invention is to provide improved means for locking an antifriction bearing upon a supporting shaft. Another object is to provide a bearing locking device especially adapted for use in a restricted space, such as the annular space between a shaft or axle and the hub of a wheel. Another object is to provide a simple one-piece locking device which can be applied to locking position and removed without special tools. Still another object is to provide an improved closure for the opening through which the bearing locking means is inserted and removed.

To these ends and also to improve generally upon devices of this character, the invention consists in the various matters hereinafter described and claimed. In its broader aspects, the invention is not necessarily limited to the specific construction selected for illustrative purposes in the accompanying drawing in which Fig. 1 is a sectional view taken axially of a wheel and axle.

Figures 1, 2, 3, 4:
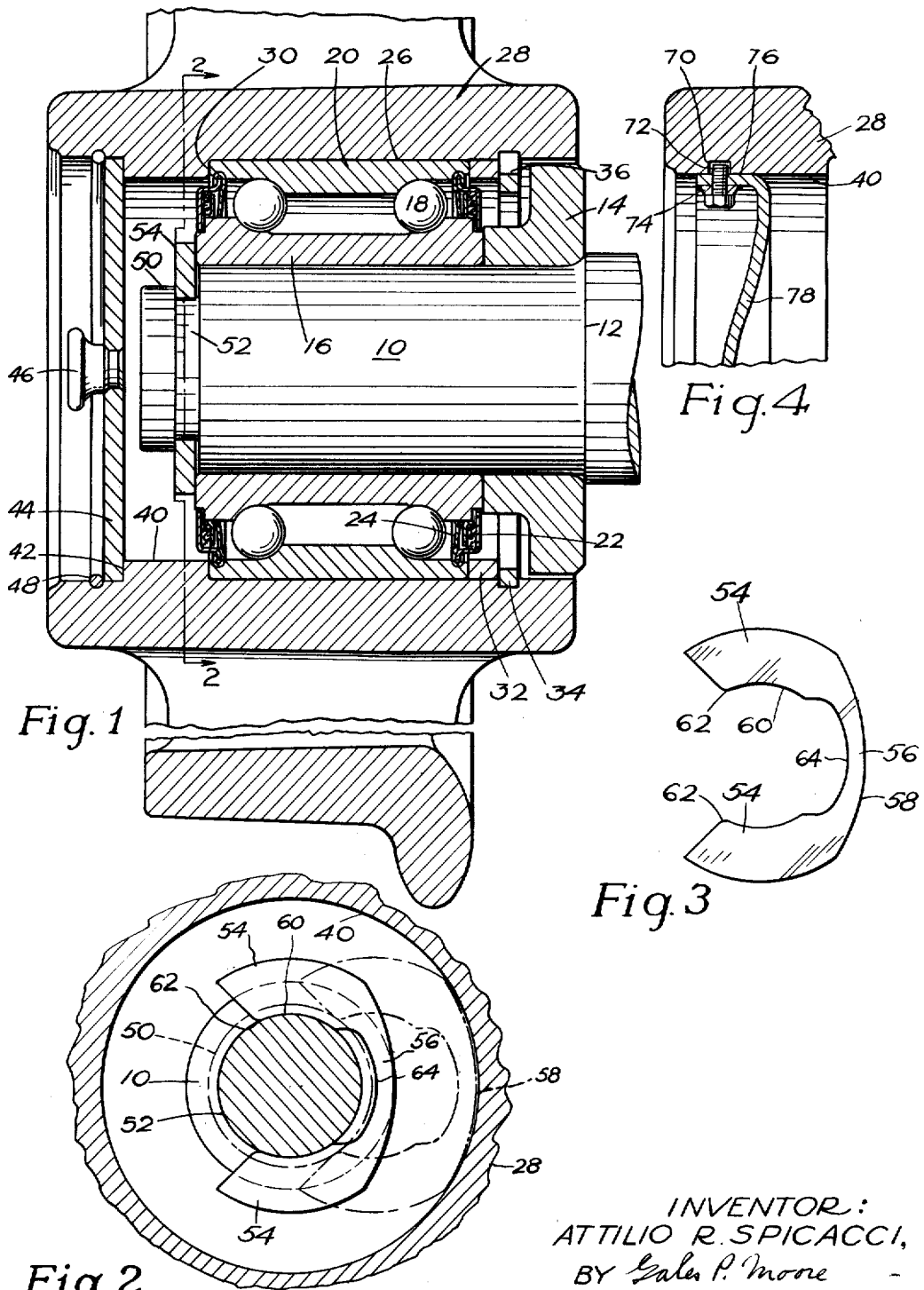
Fig. 2 is a sectional view on line 2—2 of Fig. 1, some parts being removed.
Fig. 3 is a side view of the bearing locking device.
Fig. 4 is a sectional view of an alternative form of closure and fastening therefor.

The numeral 10 indicates a shaft or axle having a shoulder 12 against which is pressed or shrunk a collar 14 forming an abutment for the inner race ring 16 of a double-row antifriction bearing having rolling elements in the form of balls 18. An outer race ring 20 is provided with raceway grooves for the rolling elements and carries suitable sealing devices, each preferably comprising washers 22 and 24 enclosing a felt ring to retain lubricant. The outer race ring 20 is contained in the bore 26 of a housing such as a wheel 28 which has an annular abutment shoulder 30 against which the outer race ring is held by a sleeve 32 and a split snap ring 34. The snap ring is set in a groove of the wheel hub and near one end is bowed inwardly as at 36 to facilitate removal.

Beyond the shoulder 30 the wheel has an internal cylindrical surface or wall 40 terminating at a shoulder 42 against which fits a closure disc or cover 44 having a knob or handle 46. The cover is retained by a split ring 48 set in a groove. The end of the axle is provided with a collar 50 outside of a groove 52, the collar being of smaller diameter than the rest of the axle and both the collar and the groove being within the surface 40. The groove is adapted to receive a locking device for the race ring 16, the locking device comprising a pair of arcuate arms 54 with a connecting springy portion 56 whose outer surface 58 is curved on an arc of approximately the same radius as that of the surface 40. The arms have their inner edges 60 curved to fit the bottom of the groove 52, such edges terminating at the points 62.

As indicated in broken lines in Fig. 2, the dimensions of the arms 54 are such that, when the locking device is inserted in the hub (whose inner surface 40 is of small radius to provide the shoulder 30) the points 62 will just pass the axle collar 50 laterally. The reduction in diameter of this terminal portion of the axle advantageously increases the restricted annular space through which the locking device is laterally inserted. The locking device can then be shifted radially of the axle into the groove 52, the points 62 engaging the bottom of the groove and springing the arms 54 around the axle. The springy connecting portion 56 yields and afterwards holds the edges 60 in gripping engagement with the bottom of the groove to avoid rattling. Bearing end thrust is transmitted to the locking device whose arms 54 have a substantial thrust area on the inner wall of the collar 50. The arms 54 have a greater radial extent than the thin springy connection 56, externally as well as internally, so that their outwardly projecting portions overlap the end of the race ring 16 with substantial areas. The inner edge 64 of the thin connecting portion 56 is so shaped and located that it lies in an arc beyond the axle collar 50 thus providing a space into which a sharp tool can be inserted for the purpose of prying the locking device out of the groove.

Fig. 4 indicates a modification of the hub closure and fastening means. The surface 40 is provided with an annular groove 70 adapted to receive a series of radially arranged screws 72. Each screw is threaded in a lug or boss 74 which is welded to a springy flange 76 bent outwardly from a dished end cap 78. No special tools are required to remove the wheel from the axle. By merely backing off the screws, the end cap can be removed to provide access for prying off the bearing locking device. Then the entire wheel and bearing will slip off the axle.

I claim:

1. In a device of the character indicated, a housing, a shaft in the housing and having a groove, a ring between the housing and the shaft at one side of the groove, a locking member comprising a pair of arms to enter the groove and a connection between the arms, the connection having its outer surface lying substantially closer to the shaft than the outer surfaces of the arms, and the arms being of a length to reach close to the shaft when the outer surface of the connection is close up to the housing, whereby the locking member can pass laterally between the housing and the shaft to enter the groove radially and the arms present maximum abutment areas to the end of the ring and to the outer wall of the groove; substantially as described.

2. In a device of the character indicated, a housing, a shaft in the housing and having a groove, an antifriction bearing on the shaft at one side of the groove, a bearing locking member comprising a pair of arms to enter the groove and a connection between the arms, the connection having its outer surface of approximately the same size and contour as the inner surface of the housing, the arms being long enough to reach from the housing nearly to the shaft whereby the locking member can be passed laterally through the restricted annular space between the housing and the shaft into line with the groove, and the arms having a greater radial extent both externally and internally than the connection to present substantial abutment areas to the end of the bearing and to the outer wall of the groove; substantially as described.

3. In a device of the character indicated, a housing, a shaft in the housing and having a groove and a terminal portion of reduced diameter beyond the groove, a ring on the shaft at one side of the groove, a locking member comprising a pair of arms to enter the groove and a connection between the arms, the outer surface of the connection being of approximately the same size and contour as the inner surface of the housing, the arms being long enough to reach from the housing nearly to the shaft whereby the locking member can be passed laterally between the housing and the shaft into line with the groove, the arms having a greater radial extent both externally and internally than the connection, and the inner surface of the connection having a size which is larger than the outer side wall of the groove; substantially as described.

4. In a device of the character indicated, a housing having an abutment shoulder and an inner wall extending beyond the shoulder, a shaft within the housing and having a groove opposite to said inner wall, a bearing between the shaft and the housing, the outer race ring of the bearing engaging the shoulder and the inner race ring terminating adjacent to the groove, a locking device entering the groove to hold the inner race ring, said locking device comprising a pair of arms and a connection between the arms, the outer surface of the connection having approximately the same radius as the inner wall of the housing and the arms being of a length to reach from the housing substantially to the shaft whereby the locking device can be passed between the inner wall of the housing and the shaft into line with the groove; substantially as described.

5. In a device of the character indicated, a locking member adapted to enter a groove in a shaft and comprising a pair of arms and a connection between the arms, the inner surfaces of the arms engaging the bottom of the groove, the inner surface of the connection standing beyond one of the side walls of the groove, and the outer surface of the connection lying closer to the shaft than the outer surfaces of the arms; substantially as described.

6. In a device of the character indicated, a locking member adapted to enter a groove in a shaft and comprising a pair of arms and a connection between the arms, the arms being arcuate and concentric with the shaft, and the connection having its outer surface eccentric to the shaft and of larger radius than the outer surfaces of the arms; substantially as described.

ATTILIO R. SPICACCI.